Oct. 25, 1966  K. VETTER ET AL  3,280,558
HYDRAULIC FORCE-MULTIPLYING SERVOMECHANISM
Filed April 22, 1965  5 Sheets-Sheet 3

Karl Vetter
Franz Forster
INVENTORS.

BY
Karl F. Ross
Attorney

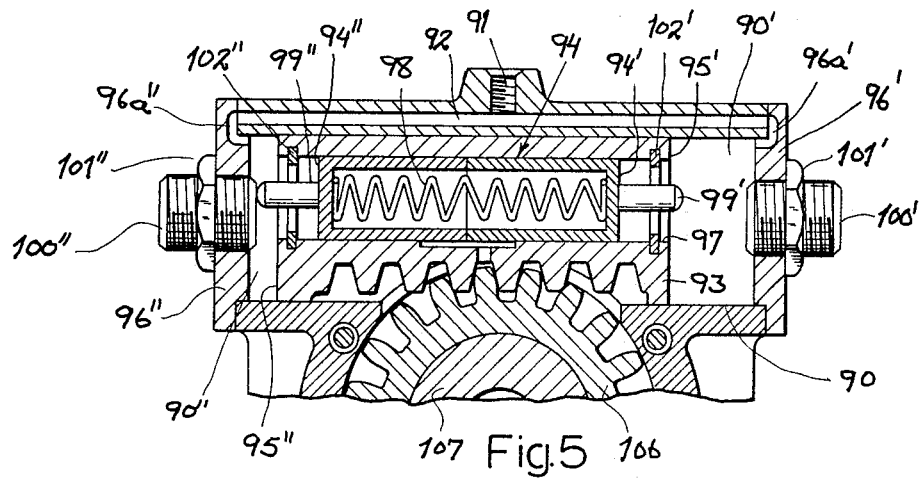

Oct. 25, 1966  K. VETTER ET AL  3,280,558
HYDRAULIC FORCE-MULTIPLYING SERVOMECHANISM
Filed April 22, 1965  5 Sheets-Sheet 5
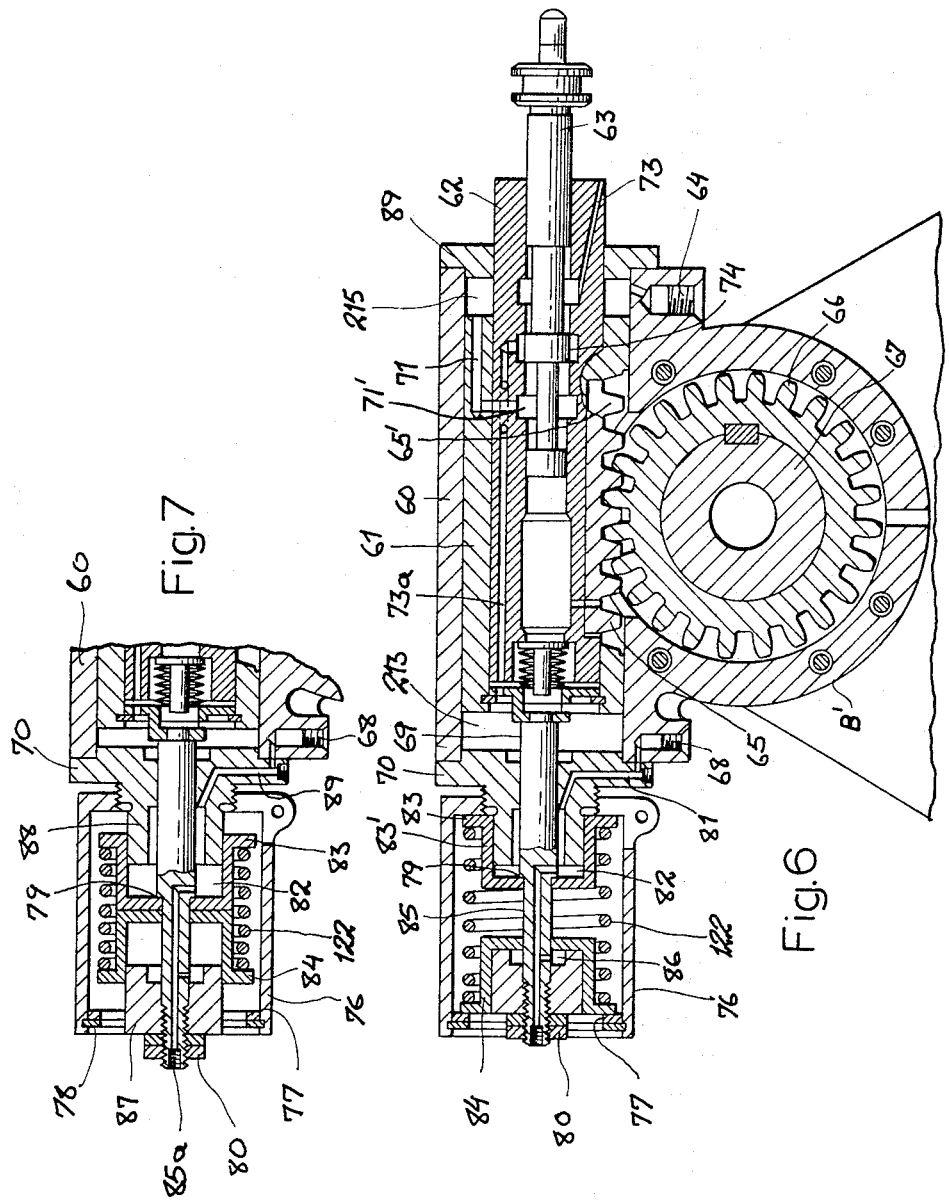
Karl Vetter
Franz Forster
INVENTORS.
BY  Karl F. Ross
Attorney

United States Patent Office 3,280,558
Patented Oct. 25, 1966

3,280,558
HYDRAULIC FORCE-MULTIPLYING
SERVOMECHANISM
Karl Vetter, Valbert, Rhineland, and Franz Forster, Karlstadt, Germany, assignors to Gesellschaft fur Linde's Eismaschinen Aktiengesellschaft, Wiesbaden, Germany, a corporation of Germany
Filed Apr. 22, 1965, Ser. No. 458,804
Claims priority, application Germany, Apr. 22, 1964,
G 40,425
18 Claims. (Cl. 60—53)

Our present invention relates to hydraulic force-multiplying servomechanisms having a working piston adapted to position the control element of a load and, more particularly, to a servo-control system for adjustable hydrostatic drives and transmissions.

In the commonly assigned U.S. Patent No. 3,107,491, issued October 22, 1963, to Otmar Kaup and Franz Forster, and the commonly assigned copending applications Ser. Nos. 445,585 and 450,913, respectively entitled Hydrostatic Drive and Adjustable Hydrostatic Drive and filed April 5, 1965, and April 26, 1965 (executed April 14, 1965), there are disclosed and claimed various stepless hydrostatic transmissions having hydrostatic pump and motor members interconnected by conduit means and, advantageously, disposed in a common housing forming a fluid reservoir. Such mechanisms constitute hydraulic transmissions with a torque or speed ratio between the input and output shafts which is determined by the position of angular adjustment of at least one of the members about a respective axis. Thus the pump and motor members of such systems may be of the axial-piston type wherein a cylinder drum is provided with a plurality of angularly spaced axially extending cylinder bores in which respective pistons are reciprocable; the pump has a control surface with a discharge bore through which fluid is forced in dependence upon the stroke of the respective pistons, whereas the control surface of the hydrostatic motor distributes fluid and pressure to the pistons of this motor to drive its output shaft. Both the input and the output shafts are formed with respective transverse flanges against which the pistons of the respective cylinder block bear, the angle of attack of the pistons with respect to the corresponding flanges determining the piston stroke and the transmission ratio. As set forth in these earlier applications and patent, adjustment is effected preferably by pivoting the hydrostatic pump about an axis perpendicular to the axis of its cylinder drum so as to vary the angle of attack of the respective pistons and the flange of the input shaft. In the "null" position of the device, the axes of the pistons of the adjustable member (pump and/or motor) of the hydrostatic-drive assembly are parallel to the axis of the respective shaft. It has been mentioned in these copending applications that servo-control devices may be employed in place of manual actuation of the controlled hydrostatic member and/or to augment such manual adjustment; for this purpose, there is described in application Ser. No. 450,913 an arrangement whereby the input shaft of the system is connected by at least one pair of gears to an auxiliary shaft via which an auxiliary or "aiding" pump is driven. The latter pump can thus serve to supply hydraulic fluid to the servomechanism in order to ensure that an undiminished flow of fluid under pressure is available for operation of the system and/or to compensate for leakage losses from the hydraulic servomechanism. In general, force-multiplying servomechanisms of the type contemplated for regulation of the hydrostatic drive include a working piston shiftable within a cylinder and defining therein one or more pressure chambers from which fluid is discharged or to which pressure is applied via a control valve.

Conventional servomechanisms of the latter type are not always suitable for use in the regulation of hydrostatic drives and other devices having a predetermined and invariable null or neutral position. In hydrostatic drives of the type described above, for example, the controlled member must have a null position in which absolutely no fluid displacement is effected even though the input shaft is driven. When the hydrostatic device is employed, for example, as a variable-torque or variable-speed transmission between an electric motor and a lifting mechanism (e.g., a winch or windlass), the hydrostatic pump can be adjustably positioned by a servomechanism. When the lifting device is under considerable load and there is a failure of electric power, the entire system is in danger of reverse operation by the presence of the load, in which case the hydrostatic motor functions as a pump and tends to drive the free-wheeling pump member connected to the electric motor. When the input shaft of this latter pump is coupled with an auxiliary pump for supplying fluid to the servomechanism, this auxiliary device may also be undesirably reversed to prevent restorative operation of the servomechanism. The latter cannot, therefore, be readily actuated to return the pump to its null position and terminate the uncontrolled reversal of the system.

Conventional servomechanisms are, moreover, unsatisfactory in transmissions for automotive vehicles, for example, since they do not generally permit of an accurate and automatic restoration of the system to the null position when the fluid supply to the servomechanism is terminated. In the absence of such positioning of the control element of the hydrostatic device, the hydrostatic pump is required to displace fluid during starting of the vehicle. This places an increased load on the starting motor and battery, which are commonly used for initiating operation of the internal combustion engine, and adds to the difficulty in obtaining immediate operation especially when the hydraulic fluid of the transmission is also cold and relatively viscous.

It is the principal object of the present invention to provide a force-multiplying servomechanism with accurate restoration to a null position upon failure of the supply of fluid to this mechanism.

Another object of this invention is to provide a hydrostatic drive assembly incorporating improved servo-control means whereby the controlled member of the assembly can be accurately positioned in a predetermined operating condition.

These objects and others which will become apparent hereinafter are attained, in accordance with the present invention, by means of a servomechanism, comprising a working piston displaceable in a cylinder in accordance with the movement of a control piston against a restoring force urging this piston into a predetermined positional relationship with respect to an abutment of a fixed housing portion, the latter possibly including the cylinder in which the working piston is displaceable; in this "null" position of the working piston, which is coupled with the controllable element of a hydrostatic assembly or other load, the stored force of the restoring means must be sufficient to reset the working piston and the member controlled thereby to their predetermined positions. The restoring means and working pistons, are, however, so disposed that the restoring means is effective to return the working piston into the aforementioned predetermined position relative to the abutment when the control pressure of the servomechanism fails. Thus the force of this restoring means, which can be constituted by springs, must be sufficient in the null position of the working piston to overcome the internal friction thereof and the forces retarding restoration of the controllable member (e.g., the hydrostatic pump of any of the assemblies described in the aforementioned copending patent applications and issued patent) to the respective null position in which no hydraulic fluid is displaced by the pump.

The force-storing means or spring can bear directly upon the working piston or can be coupled therewith via some intermediate force-transmitting element such as a toothed-wheel or pinion and a rack in mesh therewith. Thus the force-storing means can bear against the rack which, in turn, meshes with a pinion, the latter being in mesh with a further rack portion of the working piston. Advantageously, the pinion can be keyed to the adjustable member of the hydrostatic-drive assembly. Thus, if the hydrostatic pump is swingably mounted in a pair of bearing blocks, the pinion gear can be coaxial with the pump pivot and be secured to the swingable portion of the pump within one of these bearing blocks. It will be evident that in each of the cases discussed above the spring means also acts upon the adjustable member of the hydrostatic drive assembly in a manner tending to restore it to its original condition. Thus the main or working piston can be interposed between the springs or other force-storing means and the adjustable member of the assembly or coupled with the adjustable member while the springs bear thereon directly or via other force-transmitting elements.

According to another aspect of the present invention, the spring means cooperates with an auxiliary piston energized with the servo-control fluid pressure in such manner that the spring is urged away from its seat and the working piston is relieved from the spring force. The shifting of the working piston can then be effected without being influenced by the spring force as hydraulic pressure is available for the servocontrol system. It is also possible to arrange the spring means so that it constantly bears upon the working piston and is compressed to a greater or lesser extent during shifting of the latter under the servo-control pressure.

Still another feature of the present invention resides in a servo-control system of the character described in which bypass means is provided between the pressure inlet of the working chambers and the reservoir so that hydraulic fluid can be induced to flow into a rapidly expanding working chamber when the pump is deactivated or otherwise fails to deliver sufficient fluid to accommodate this expansion of the chamber. This arrangement permits the spring or force-storage means to displace the working piston relatively rapidly upon failure of the pressure source. In accordance with this feature of the present invention, therefore, a check valve or unidirectional valve is provided between the pressure line (i.e. the outlet side of the servomechanism pump) and the reservoir, this valve being poled to remain closed upon the maintenance of a fluid pressure within the pressure line of the cylinder, but to open upon the development of an underpressure in this line. This unidirectional valve means thus constitutes a bypass permitting rapid movement of the working piston and the hydrostatic device controlled thereby into its null position under the force of the springs without admitting air into the system. The unidirectional valve means, moreover, also functions to supply fluid to the servomechanism pump when the latter is reversed and serves as an eduction device. The bypass means can, according to this aspect of the invention, be constituted by a relatively unobstructed passage through a continuous-flow pump. Thus the pump supplying pressure to the servomechanism need not be of the usual gear type or of the obstructed-passage type in which no continuous flow is possible between the ports of the pump when the latter is immobilized; the pump can be of the centrifugal or impeller type generally used for developing high volume rates of flow at low pressures since such pumps afford a continued flow passage even when immobilized. It should be understood, however, that a pump of the latter type will constitute a suitable bypass according to our invention but will operate at low efficiencies because the servomechanism generally requires relatively low volumes at substantial pressures.

According to yet a further feature of the present invention, means is provided between the cylinder and/or piston member of the servomechanism and the device to be regulated thereby, to permit an accurate setting of the predetermined position of the adjustable device to which the spring means returns the unit.

The above and other objects, features and advantages of the present invention will become more readily apparent from the following description, reference being made to the accompanying drawing in which:

FIG. 4 is a cross-sectional view taken transverse to the pivotal axis of a controllable hydrostatic device, according to our invention, showing a servomechanism therefor in axial section;

FIG. 5 is a fragmentary view similar to FIG. 4 showing a portion of the servomechanism in another operating position thereof;

FIG. 6 is a view similar to FIG. 4 illustrating a servomechanism according to another embodiment of our invention;

FIG. 7 is a detail view of the resilient or force-storing means of the device of FIG. 6 in another operating position.

Figure 1:
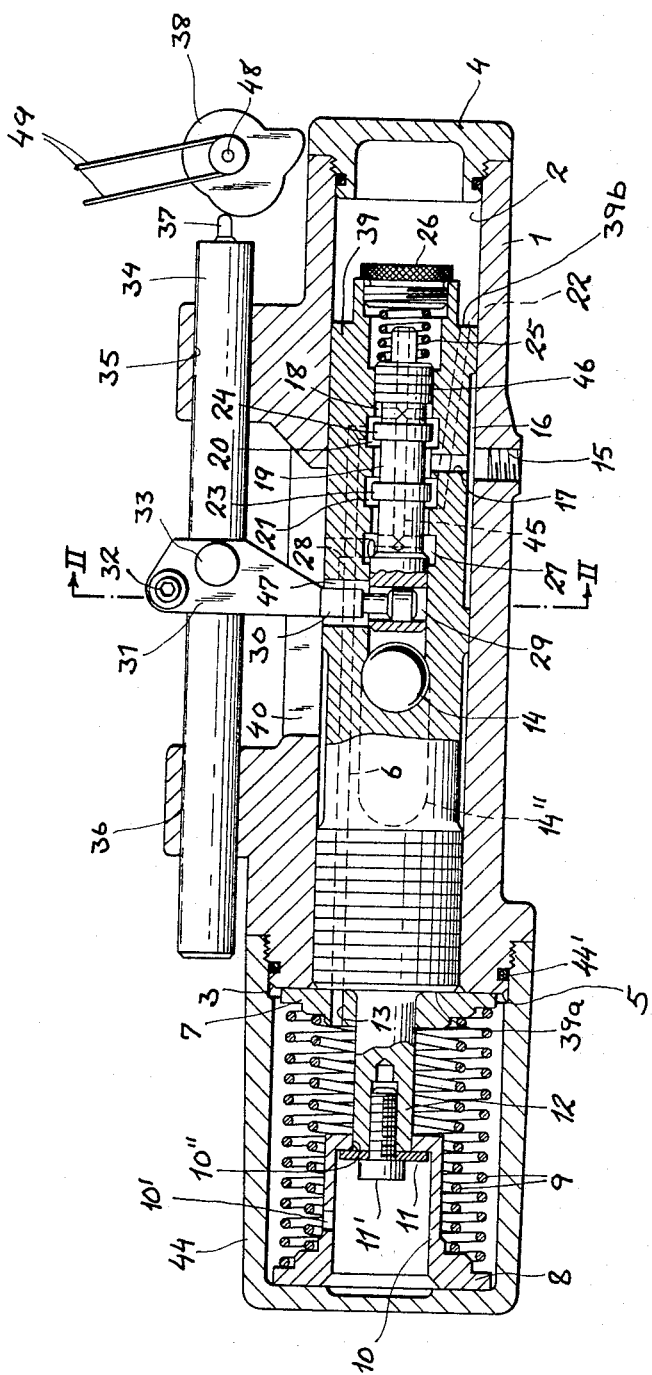
FIG. 1 is an axial cross-sectional view through a servomechanism embodying the principle of the present invention.

In the embodiment illustrated in FIG. 1, a cylinder 1 is axially shiftable in a housing 41 and is provided with an axially extending bore in which the working piston 39 is shiftable. Piston 39 defines within this bore and at the opposite axial ends thereof a pair of working chambers 2 and 3 in which piston surfaces 39b and 39a of the piston 39 are respectively exposed to fluid under pressure. The annular surface 39a of piston 39, exposed to fluid in chamber 3, lies flush with a surface 5 at the corresponding extremity of the cylinder 1 in the "null" position of the force-multiplying servomechanism. This flush arrangement of surface 39a and surface 5 is accomplished by means of an abutment or pressure plate 7, held against the relatively fixed surface 5 by at least one and preferably a plurality (two shown) of coaxially disposed compression springs. The latter are sandwiched between the pressure plate 7 and a further pressure plate 8, axially spaced from plate 7 and forming seats for the springs 9. The pressure plate 8 is formed with a central boss 10 extending in the direction of plate 7 and apertured at 10′ to permit hydraulic fluid to flow from the space between these pressure plates into the interior of and behind the plate 8 and thereby prevent the fluid from impeding movement of plate 8 in the manner described in greater detail hereinafter. A transverse wall of the boss 10, in axial alignment with the piston 39, is formed with an opening 10″ through which an extension 12 of the piston 39 passes.

The extension 12 is provided on its left-hand extremity (FIG. 1) with an abutment plate 11 held in place by a screw 11′, the plate 11 being disposed within the boss 10 and engageable therewith to draw the pressure plate 8 to the right upon a corresponding movement of the piston 39. The pressure plate 8, however, normally bears against the left-hand extremity of a spring enclosure 44 which is threaded onto the cylinder 1 while a seal 44' is interposed therebetween to render the spring enclosure 44 substantially fluidtight. It will be evident that the working piston 39 can, from its null position illustrated in FIG. 1, be shifted to the left until the pressure plate 7 abuts the boss 10 of the pressure plate 8, the latter being held stationary against the left-hand wall of the spring enclosure 44. In this case, the extension 12 of the piston 39 will pass into the axial clearance within the boss 10 with which it forms a lost-motion linkage. On the other hand, the movement of piston 39 to the right from the null position (when hydraulic fluid is supplied to chamber 3 and the interior of the spring enclosure 44) results in an axial entrainment of the pressure plate 8 to the right by plate 11 and extension 12, while pressure plate 7 is held immobile against the surface 5 of the cylinder 1. In the null position illustrated in FIG. 1, the springs 9 are shown in their position of maximum extension (i.e. minimum compression) to which the springs restore the system when no working pressure is applied to the piston 39. The latter thus is always returned to this null position in which its surface 39a is flush with surface 5 of cylinder 1 and abuts the complementary surface of pressure plate 7.

The working piston 39 is, moreover, provided with a central bore 18 in which a control piston 19 is longitudinally shiftable. Bore 18 is provided with three axially spaced annular recesses 20, 21 and 27; a radial bore 17, formed in piston 39, opens into bore 18 between the recesses 20 and 21 and also communicates with a clearance 16 between a portion of the periphery of the piston 39 and the interior wall of cylinder 1. This clearance, whose length is at least equal to the maximum stroke of the piston 39, is supplied with hydraulic fluid from a pump via other fluid-pressure means as will be described in greater detail hereinafter. Thus, the inlet 15 communicates with the clearance 16 in all positions of the piston 39. The recess 21 of bore 18 communicates with the working chamber 2 via a bore 22 in the piston 39 while a further bore 6 in this piston communicates between the annular recess 20 and the working chamber 3. The latter, moreover, also connects with the interior of the spring enclosure 44 via an aperture 13, aligned with bore 6.

Figure 3:
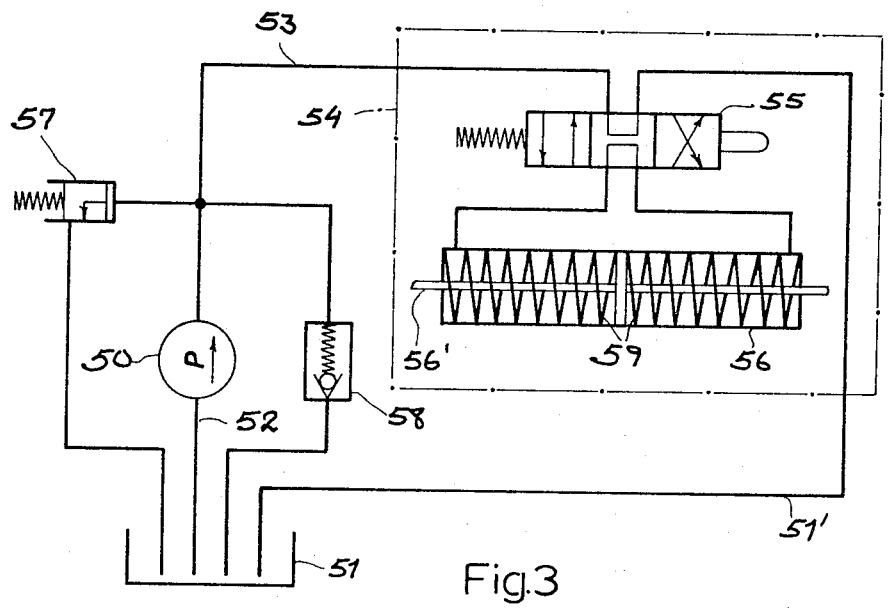
FIG. 3 is a flow-diagram showing a servo-control system according to this invention adapted to be employed with the servomechanisms described herein.

The control piston 19 is provided with an annular shoulder or flange 23 whose axial extent is somewhat less than the axial extent of recess 21 with the edges of which it co-operates to control fluid flow from the passage 17. A similar shoulder 24, axially offset from shoulder 23, has an axial length less than that of recess 20 with whose edges it cooperates to control the fluid flow to the bore 6 of the piston 39. A system of axial and radial bores within the control piston 19 and generally designated 45 communicates between the right-hand side of the bore 18 (i.e. to the right of shoulder 24) and the annular recess 27 at the left-hand side of this bore; the right-hand side of the bore is limited by the head 46 of piston 19. The head 46 and the shoulders 23, 24 correspond in their outer diameters precisely to the inner diameter of the bore 18 so that a sealing fit is provided when the valve-forming piston 19 is displaced axially within the piston 39. From the annular recess 27, the fluid medium can pass through a radial bore 28 to a fluid-storage reservoir (FIGS. 1A and 3).

Figure 2A:
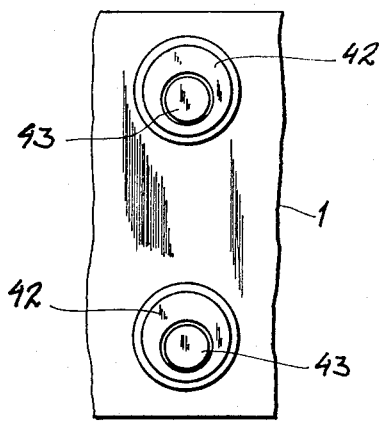
FIG. 2A is a side view of the detail of FIG. 2 showing means for adjusting the servomechanism relative to its support structure.
Figure 2:
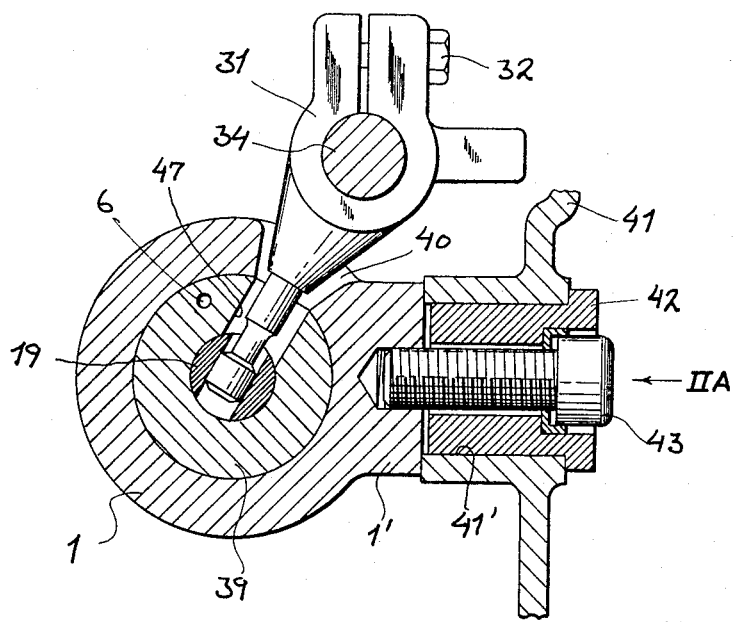
FIG. 2 is a cross-sectional detail view drawn to an enlarged scale and taken generally along the line II—II of FIG. 1.

The control system 19 is provided with a further radial bore 29 into which a stud 30 extends through a lateral opening 49 in the working piston 39. The stud 30 is integral with a clamping sleeve 31 which can be fixed to a rod 84 in any position of axial adjustment via a clamping nut 32. The rod 34 is axially shiftable in a pair of support lugs 35, 36 of the cylinder 1. Rod 34, moreover, is provided with a cam follower 37 in engagement with a cam 38 displaceable by a cable 49 about the axis of rotation 48 of the cam. A further spring 25 tends to center the control piston 19 and is connected with the head 46 of the piston 19 and with a plug 26 closing the bore 18. A cap 4 closes the right-hand extremity of the cylinder 1. The latter is provided with an axially extending slot 40 in alignment wth the opening 47 (FIG. 2) to clear the stud 30.

Figure 1A:
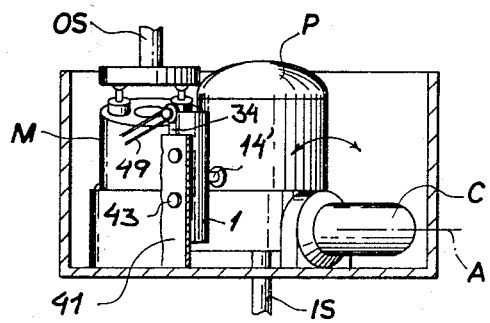
FIG. 1A is a somewhat diagrammatic elevational view showing the application of the servomechanism of FIG. 1 to the regulation of a hydrostatic-drive assembly.

Referring now to the hydrostatic-drive assembly diagrammatically llustrated in FIG. 1A, it may be seen that the assembly comprises a hydrostatic pump P of the axial-piston type which communicates via a conduit C with a hydrostatic motor M. These elements of the assembly are mounted in a common housing forming a reservoir for the hydraulic fluid and in which the input shaft IS of the pump P and the output shaft OS of the axial-piston motor M are journaled. The transmission ratio of this drive is determined by the angular position of pump P about its axis A, the displacement being effected via the servomechanism 1, etc. illustrated in FIGS. 1, 2 and 2A. This mechanism is coupled with the pump P via an arm 14' pivotally linked at 14 with the piston 39 and passing through an elongated opening 14" in the cylinder housing 1. The remainder of the hydraulic assembly illustrated in FIG. 3 can also be accommodated within the reservoir containing the adjustable pump and the hydrostatic motor. While the present force-multiplying servo-device can be employed in many installations requiring a definite null position, it should be understood that it is especially effective when employed with the hydrostatic-drive assemblies of the commonly assigned copending applications mentioned above and the commonly assigned patent also identified earlier.

Prior to operation of the servomechanism illustrated in FIG. 1, it is necessary to position the cylinder 1 so that, in the null position of the device, the hydrostatic pump or other component controlled thereby is also in its precise null position. For this purpose, the housing 41 supporting the cylinder 1, is provided with a pair of axially spaced transverse bores 41' (FIGS. 2 and 2A) in which eccentric bushings 42 are received. Each of these bushings 42 is connected by a locking screw 43 to a radially projecting and axially extending mounting portion 1'. By rotation of the eccentric bushings 42, whose heads are enlarged and can be knurled, milled or otherwise rendered suitable for manual rotation, the clamping screws 43 are tightened in place and the cylinder 1 is locked to the housing portion 41 in its precise null position. It should be recalled, moreover, that the force constant of springs 9 should be so selected that they are capable of restoring both the working piston 39 and the hydraulic component controlled thereby to the null position illustrated in FIG. 1 upon a failure of the supply of hydraulic fluid to the bore 17. The springs 9 thus must overcome the internal friction of the force-multiplying unit illustrated in FIG. 1 as well as the friction at the journal blocks B of the adjustable hydrostatic pump P.

Upon rotation of the cable 49 and the cam 38 and/or upon displacement of the rod 34 via the formation 33, the movement of this rod 34 is translated into a corresponding displacement of member 14 in the same direction with multiplied force. Thus, if the rod 34 is shifted to the left, it produces an incremental displacement of the control piston 19 in this direction to block the flow of fluid under pressure from bore 17 to passage 6 while permitting such flow to passage 22 and working chamber 1. Simultaneously, the shoulders 23 and 24 connect the recess 27 and the return flow passage 28 with chamber 3 and the spring enclosure 44 via the passage 6. Fluid pressure is applied to the surface 39b of of the working piston 39 (from chamber 2) to displace this piston to the left and compress the springs 9, pressure plate 7 being entrained with the surface 39a of the piston. A corresponding displacement of rod 14 is effected at a force determined by the pressure supplied to chamber 2 in excess of that required to compress the springs 9. The force originally applied to piston 19 is, however, insignificant so that a considerable force multiplication is effected. In order to displace member 14 to the right (FIG. 1), a corresponding displacement of rod 34 can be effected. In this case, the control piston 19 will be shifted to the right to connect passage 6 with the pressure line 17 while passage 22 is connected with recess 27 via chamber 2. In either case, the piston 39 moves by a distance just sufficient to compensate for the displacement of the stud 30 and the control piston 19 and re-establish an arrangement in which hydraulic pressure balances the spring 9 in all positions of the control piston 19.

Referring now to FIG. 3, in which we show an overall view of a servosystem according to the present invention, it can be seen that a pump 50, serving to supply fluid under pressure to the hydraulic network of the servomechanism, has its intake line 52 immersed in hydraulic fluid within a reservoir 51 (e.g. the housing of the hydrostatic system which is controlled by the servomechanism) and supplies fluid via a line 53 to a servodevice such as that illustrated in FIG. 1 and diagrammatically represented within the dot-dash rectangle 54 of FIG. 3.

The servomechanism diagrammatically illustrated at 54 comprises a control valve 55 (e.g. the control piston 19 of FIG. 1) and a working piston 56′ reciprocable within the cylinder 56 but restored to its predetermined position by the force-storing means shown at 59. The springs 59 are representative of the restoring means 9 of the servomechanism of FIG. 1 while the main piston 56′ and the cylinder 56 are symbolic of the working piston 39 and the cylinder 1 of the embodiment of FIG. 1.

A pressure-relief valve 57 is connected between the discharge side of pump 50 (line 53) and the reservoir 51 and is dimensioned to open when the pressure in line 53 increases to a point of possible damage to the pump. The latter can be, of course, the pump supplying the inlet 15 of the device of FIG. 1 and can be driven by an auxiliary shaft as set forth in copending application Ser. No. 450,913 and entitled, Adjustable Hydrostatic Drive. An important feature of the present invention resides in the provision of bypass means between line 53 and the reservoir 51 permitting the eduction of fluid from the reservoir through line 53 into the chambers of the cylinder (1 or 56) upon the failure of the pump to continue delivering fluid under pressure to the sermomechanism. As previously noted, this failure can be a consequence of reversal of the hydrostatic system in which the main pump functions as a motor and the auxiliary or servomechanism pump is reversed. It is also possible that the auxiliary pump merely fails to supply fluid at a rate sufficient to accommodate the restoration stroke of the working piston. The means constituting a bypass between the cylinder chambers and the reservoir 51 thus prevents the formation of air pockets within the servosystem. Such means can include a check valve 58 poled to block the shunting of fluid from the outlet of pump 50 to the inlet when a pressure differential in this direction is supplied across the check valve. When, however, this pressure differential is reversed, e.g. as a consequence of rapid expansion of the cylinder chamber of the servomechanism valve 58 opens to permit fluid to be drawn from the reservoir 51 into the expanding cycling chamber. A pressure differential of the latter type results when the pump 50, by virtue of a failure of motive power, cannot deliver sufficient fluid to accommodate the expanding pump chamber. The springs 59 will rapidly shift the piston 56′ into its null position and expand a chamber coupled with the reservoir, the opening of bypass valve 58 permitting rapid shifting of the mechanism into this null position. It will be understood that a similar bypass can be formed by the pump itself when the latter is of the continuous-flow type, i.e. free from obstruction of the flow channel during operation and nonoperation of this pump. In the latter case, the unobstructed flow channel of the pump forms a suitable bypass passage. Such pumps include centrifugal and impeller pumps. Moreover, the servomechanism 54 of FIG. 3 represents the devices illustrated in FIGS. 4, 5 and 6, in addition to that of FIG. 1. All of these embodiments are to be understood as associated with a pump 50 and a bypass valve 58, a return duct 51′, a reservoir 51 and a pressure-relief valve 57 as illustrated in FIG. 3 and described above.

In the embodiment illustrated in FIGS. 4 and 5, a hydraulic cylinder 90 is provided for the force-storing means which is effective to return the unit to its null position upon displacement into extreme positions on opposite sides of this null position. An axially slidable force-transmitting member 93 is received within the cylinder 90 and defines therein a pair of working chambers in which the piston faces 94′, 94″ of bipartite piston means 94 are exposed. Fluid is supplied under pressure to these chambers by a bore 91 in the cylinder housing, this bore communicating with an axially extending channel 92 whose opposite ends terminate in the chambers 90′ and 90″, respectively. The passages interconnecting the channel 92 with the chambers 90′ and 90″ are formed by recesses 96a′ and 96a″ in the end plates 96′ and 96″ closing the cylinder bore 90 at its opposite ends. The force-transmitting element 93 is provided with a further cylinder bore 97 in which the piston means 94 is axially shiftable, this piston means 94 constituting an enclosure for a compression spring 93 which urges the auxiliary pistons 94′, 94″ outwardly away from one another (FIG. 4). Each of the auxiliary pistons 94′, 94″ is provided with a respective projection 99′, 99″ juxtaposed with a respective abutment screw 100′, 100″ threaded into the respective end plate 96′, 96″ and locked against movement by a counternut 101′, 101″. Moreover, the force-transmitting element 93 is provided with a pair of abutment-forming expansion rings 102′, 102″ at the opposite extremities of cylinder bore 97, these rings forming a lost-motion linkage with the piston assembly 94. The cylinder bore 97 is, moreover, formed with an enlargement 103 (FIG. 4) into which a transverse bore 104 opens to equalize the pressure between the interior of piston means 94 and the exterior thereof. Element 93 is formed with teeth 105 and thus constitutes a rack which meshes with a pinion 106 keyed to the axle 107 of an adjustable hydrostatic pump of the type described in the commonly assigned copending applications and issued patent described above. Thus the entire servomechanism can be incorporated in one of the bearing blocks of such an assembly, the axle 107 being rigid with the swingable part of the pump. Axle 107 can, moreover, constitute a conduit means connecting the pump with a hydrostatic motor or serving as an inlet for hydraulic fluid from the surrounding reservoir to the pump.

In the bearing block or housing 108, at a location diametrically opposite cylinder 90, a further cylinder 109 is provided; a working or follower piston 110 is axially shiftable within this cylinder. Within the working piston 10, there is provided a control piston 111, constituting a valve controlling the flow of hydraulic fluid into the pressure chambers 113 and 115 formed between the cover plates 112, 114 and the right- and left-hand extremities of the piston 110, respectively.

The chamber 115 is connected via a passage 117 in the working piston 110 and a radial bore 117′ with an annular recess 117″ in a bore 118 in which the control piston 111 is displaceable. A further passage 113′ communicates between the pressure chamber 113 and an annular recess 113″ in the bore 118. Chamber 115, moreover, is supplied with hydraulic fluid under pressure via a fitting 116, the latter being connected with an auxiliary or servomechanism pump such as that illustrated at 50 in FIG. 3. The control piston 111 is formed with a shoulder 119 which cooperates with the annular recesses of bore 118 to control the flow of fluid from the chamber 115 to chamber 113 via the passage 113′ or to shunt the fluid from chamber 115 to a recess 120′ and thence to a bore 120 opening into the cylinder reservoir. The working piston 110 is provided with teeth 121 and thus constitutes a rack in mesh with the pinion 106. An equalizing bore 121' is provided in the piston 110 while a plurality of Belleville washers 110a are disposed in a recess 110b and bear against a disk 110c held in abutting relationship with a spring ring 110d. Since the area of the piston face 110e is substantially in excess of the area of face 110f exposed to fluid-pressure chamber 115, the piston 110 is constituted as a differential piston. Thus, pressure from the auxiliary pump introduced at 116 acts constantly on area 110f of piston 110 and, when valve piston 11 is moved to the right from the position shown in FIG. 4, chamber 113 is permitted to drain through passages 113', 113'', 120' and 120, thus permitting movement of piston 110 to the right from the position shown until land 119 closes recess 113. A shifting of the control piston 111 to the left, however, will permit hydraulic fluid to flow from the pump through fitting 116 to chamber 115 and via passage 117 and radial bore 117' and annular recess 113'' to passage 113' into chamber 113 so that a greater force is applied to the piston 110 against the surface 110e and this piston is thereby also shifted to the left. The working piston 110 thus follows the control or master piston 111 as long as the servomechanism pump supplies hydraulic fluid to the unit at 116. The pistons 110 and 111 always tend to be self-restoring to a nuetral relative position. Linear movement of the piston 110 is translated into a rotary displacement of the pinion 106 and the control element of the hydrostatic device. Since both surfaces 95' and 95'' of the tooth element 93 are supplied with fluid at the same pressure (i.e. the pressure of the servomechanism pump), no net fluid pressure tends to displace the element 93. The same pressure is, however, applied to both pistons 94' and 94'' so that the spring 98 is compressed between them as will be seen in FIG. 5. In this condition of pistons 94' and 94'', element 93 can be displaced by the pinion 96 without having to overcome frictional forces resulting from relative movement of the piston assembly 94 and the tooth element 93. Such movement continues until one of the projections 99', 99'' (depending upon the direction of rotation of the pinion) is brought to bear against a respective one of the stops 100', 100''; continued rotation of the pinion 106 then results in a joint displacement of the auxiliary pistons 94', 94'' within the cylinder bore 97. Any hydraulic fluid in the interior of the piston assembly 94 is relieved via the enlargement 103 and the bore 104. In the event of a sudden failure of the servomechanism pump, the pressure within channel 92 falls suddenly and the spring 98 urges the pistons 94' and 94'' away from one another against the respective expansion rings 102', 102''. The tooth element 93 is thus shifted until both projections 99' and 99'' come to rest against the stops 100', 100'' (FIG. 4), the pinion 106 being rotated simultaneously together with the adjustable element of the hydrostatic assembly under the force of spring 98. The "null" position of the unit (FIG. 4) can be established by adjusting the stops 100', 100'' and locking them in place via the counternuts 101', 101''. Hydraulic pressure also falls within chamber 115 so that neither the control piston nor the working piston impedes the restoration of the assembly to its null position. It will be evident, therefore, that this arrangement permits the removal of the effect of the resilient means 98 whenever sufficient control pressure is available to permit the servomechanism 110, 111 etc. to be effective while recoupling the resilient means upon a failure of the fluid pressure. The decoupling of the resilient means permits the servomaster and follower piston 111 and 110 to function without having to overcome the stored force.

Figure 6A:
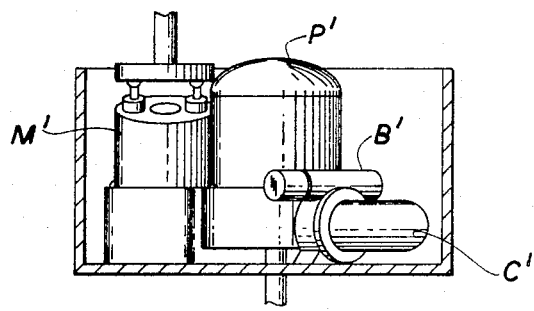
FIG. 6A is a view similar to FIG. 1A showing a hydrostatic-drive assembly provided with the control mechanism of FIG. 6.

In the system of FIGS. 6 and 7, which is seen in FIG. 6A to control a hydrostatic pump P', the motion of a working piston 61 is transmitted to the swingable pump P via a pinion 66. The pump P' is mounted in a pair of journal blocks, one of which is shown at B' and contains the servomechanism assembly illustrated in greater detail in FIGS. 5 and 6. The other journal block can be formed with a conduit C' connecting the pump P' with the hydrostatic motor M' (FIG. 6A). These elements of the hydrostatic assembly can be identical with those illustrated and described in the aforementioned copending applications. The working piston 61 is axially displaceable within a cylinder 60 and is provided with a longitudinally shiftable portion 62. The piston 61 is toothed at 65 to form a rack in mesh with the pinion 66. The piston member 62 is also provided with a set of teeth 65', generally in line with the teeth 65 of the outer piston member 61 but adapted to be axially offset therefrom to take up the play in the rack-and-pinion connection. The pinion gear 66 is keyed to the shaft or axle 67 of the pump P'.

A control piston 63 is axially shiftable within a bore of the member 62 to control the flow of hydraulic fluid from a pressure chamber 215 to a further chamber 213 or the exterior via a passage 73 as previously described with reference to the chamber 115, 113 and passage 120. Thus, hydraulic fluid is supplied under pressure to the cylinder 60 via a port 64 (from a pump such as that illustrated at 50) whereby the fluid under pressure can flow from chamber 215 via passage 71 to the annular recess 71'. A passage 73a, communicating with the chamber 213, opens into an annular recess 74 with which a shoulder 72 of the control piston 63 cooperates in the manner previously described.

An extension 69 of the piston 61, 62 projects axially through a cover plate 70 and is formed with an annular abutment shoulder 79 engageable with a pressure plate 83. The free end of this projection 69 is provided with a pair of counternuts 80 for axially adjusting a further pressure plate 84 with respect to the piston, the plates 83, 84 forming seats for a compressed spring 122 within the spring enclosure 76. The latter is provided with a spring ring 77 forming a left-hand limit for the pressure plate 84 which is axially shiftable with respect to a bushing 87 threaded onto the free end of the extension 69. The latter is provided with a channel 85 communicating between the pressure chambers 82 and 86. Pressure chamber 82 is defined between a boss 88 of cover plate 70 and a sleeve portion 83' of the pressure plate 83. The chamber 86 is formed between the bushing 87 and the sleeve portion of pressure plate 84. Plates 83 and 84 constitute auxiliary pistons held apart by the spring 122 and forming a lost-motion linkage with the extension 69. When hydraulic pressure is supplied to the chambers 82 and 86 forming port 68 via a passage 81, the pistons 83 and 84 are forced together and compress the spring 122 between them to remove the spring force from any effect upon the extension 69 and the working piston 61, 62 carrying the latter. Thus, this embodiment provides for relieving of spring pressure upon the working piston when the pressure source, i.e., the auxiliary pump, operates properly. When the pump is effective, the resilient force-storing means occupies the position illustrated in FIG. 7 while the master piston 63 is followed by the piston 61, 62 in the manner described with reference to FIGS. 4 and 5. Upon a failure of the pump pressure, spring 122 urges the auxiliary pistons 83 and 84 axially outwardly until piston 84 engages the abutment ring 77 and the piston 83 abuts against the right-hand end of the spring enclosure 76. The abutment 79 of the piston extension 69 is thus displaced to the right (FIG. 6) to shift the rack teeth 65, 65' in the same direction and rotate the pinion 66 and the axle of pump P' in a clockwise sense until the bushing 87 is brought to bear upon the pressure plate 84. This position is, of course, the null position of the assembly and can easily be adjusted via the threaded bushing 87 and the counternuts 80. A plug 85a closes the left-hand end of passage 85.

Thus, the devices of FIGS. 4, 5 and 6, 7 are provided with force-storing means whose pressure members 83, 84 and 94', 94'' are urged axially outwardly by the spring means 122, 98 until they bear against the respective abutments 77, 88 and 100', 100'' of the abutment means within the respective housing B' and 108. Both these housing means are provided with fluid-pressure means 68, 81, 82, 85, 86 and 91, 92, 90', 90'' for loading the force-storing means beyond their prestressed state independently of the movement of the respective piston 61, 62 and 110, 110' when fluid is available from the source (e.g. pump 50); the fluid-pressure means are connected in parallel with the pressure chambers for displacing the piston. In the system of FIG. 1, the force-storing means 7, 8, 9 is loaded by the hydraulic displacement of the piston 39 and, in both embodiments of FIG. 1 and FIGS. 6, 7, the force-storing means bears directly against the piston with which it forms a lost-motion connection whereas the force-storing means of FIGS. 4, 5 is effective through the force-transmitting means 121, 106, 93 and constitutes a lost-motion connection with the latter.

The invention described and illustrated is believed to admit of many modifications within the ability of persons skilled in the art, all such modifications being considered within the spirit and scope of the appended claims.

We claim:

1. A hydraulic-force-multiplying servomechanism comprising:
   housing means forming a hydraulic cylinder;
   a follower piston reciprocable within said cylinder connectable with a load and defining within said cylinder at least one fluid-pressure chamber;
   valve means communicating with said chamber and connectable between said chamber and a source of hydraulic fluid under pressure, said valve means including a master actuating member displaceable for regulating the fluid pressure supplied to said chamber to displace said piston correspondingly from a predetermined position relative to said cylinder;
   force-storing means loadable at least upon the supplying of fluid to said chamber and operatively connected with said piston urging same to said position; and
   abutment means co-operating with said force-storing means for retaining same upon unloading and return of said piston to said position.

2. A servomechanism as defined in claim 1 wherein said force-storing means bears directly on said piston for restoring same.

3. A servomechanism as defined in claim 1 wherein said force-storing means includes a pair of axially offset pressure members axially shiftable relative to one another and to said piston, and spring means seated against said pressure members and urging them axially apart, said piston forming a lost-motion linkage with said pressure members, said housing means being provided with a pair of axially spaced abutments constituting said abutment means and respectively engageable with said pressure members at least upon unloading of said spring means.

4. A servomechanism as defined in claim 3, further comprising fluid-pressure means connected with said source in parallel with said valve means for loading said force-storing means by urging said pressure members together and away from said abutments.

5. A servomechanism as defined in claim 1, further comprising force-transmitting means interposed between said force-storing means and said piston.

6. A servomechanism as defined in claim 5 wherein said force-transmitting means includes a rack displaceable by said force-storing means, and a pinion meshing with said rack, said piston being provided with a further rack in mesh with said pinion.

7. A servomechanism as defined in claim 6 wherein said force-transmitting means is swingable about the axis of said pinion, said pinion being fixed to an axle connected with said load.

8. A hydraulic force-multiplying servomechanism system comprising:
   a pump for displacing hydraulic fluid and developing a pressure therein, said pump having a fluid-inlet side and a fluid-outlet side;
   housing means forming a hydraulic cylinder;
   a follower piston reciprocable within said cylinder and connectable with a load for displacing same, said piston defining within said cylinder at least one fluid-pressure chamber;
   valve means communicating with said chamber and including a master actuating member displaceable for regulating the fluid pressure supplied to said chamber to displace said piston correspondingly;
   conduit means connecting said outlet side of said pump with said valve means for supplying fluid under pressure thereto;
   a reservoir for hydraulic fluid;
   force-storing means loadable for operation of said piston and adapted to shift the latter upon reduction of the pressure in said conduit means; and
   unidirectionally effective bypass means interconnecting said conduit means and said reservoir for permitting the passage of fluid from the latter to said conduit means upon such reduction of pressure in said conduit means while blocking flow of fluid from said conduit means to said reservoir.

9. A system as defined in claim 8, further comprising abutment means co-operating with said force-storing means for retaining same upon unloading of said force-storing means to fix said piston in a predetermined position relatively to said cylinder.

10. A system as defined in claim 9 wherein said bypass means is a unidirectional check valve connected between said conduit means and said reservoir for blocking fluid flow from said conduit means upon the development of a fluid pressure at said outlet side of said pump sufficient to counteract the effect of said force-storing means.

11. A system as defined in claim 9 wherein said pump is a continuous flow pump forming a substantial unobstructed passage for the flow of fluid from said reservoir to said conduit means upon immobilization thereof.

12. A system as defined in claim 9 wherein said force-storing means includes a pair of axially offset pressure members axially shiftable relatively to one another and to said piston, and spring means seated against said pressure members and urging them axially apart, said piston forming a lost-motion linkage with said pressure members, said housing means being provided with a pair of axially spaced abutments constituting said abutment means and respectively engageable with said pressure members at least upon unloading of said spring means.

13. In a hydrostatic-drive assembly, in combination:
   a reservoir for hydraulic fluid;
   a hydrostatic-pump member supplied with fluid from said reservoir and having an input shaft connectable with a source of motive power;
   a hydrostatic-motor member energizeable with fluid under pressure by said pump member and having an output shaft connectable with a load displaceable thereby, at least one of said members being shiftable for adjustment of the transmission ratio between said shafts and having a predetermined null position wherein said output shaft is substantially de-coupled from said input shaft; and
   a force-multiplying servomechanism system for displacing said one of said members, said system comprising:
   housing means forming a hydraulic cylinder,
   a follower piston reciprocable within said cylinder and operatively connected with said one of said members while defining within said cylinder a pair of oppositely effective fluid-pressure chambers,
   valve means communicating with said chambers and including a master piston displaceable for regulating the fluid pressure supplied to at least one of said chambers to displace said follower piston correspondingly from a predetermined position thereof relative to said cylinder and corresponding to said null position of said one of said members, force-storing means loadable at least upon the supplying of fluid to said chambers and operatively connected with said follower piston for urging same into said predetermined position thereof, and abutment means co-operating with said force-storing means for retaining same upon the unloading of said force-storing means and the return of said piston to said predetermined position thereof.

14. The combination defined in claim 13, further comprising adjusting means on said housing means for shifting said piston in said predetermined position thereof to dispose it in coincidence with said null position of said one of said members.

15. The combination defined in claim 14 wherein said adjusting means comprises means for displacing said abutment means relatively to said one of said members.

16. The combination defined in claim 15 wherein said adjusting means includes a support for said housing means fixedly positioned relative to said one of said members, and at least one eccentric bushing interconnecting said housing means and said support for axially shifting said cylinder relatively thereto.

17. The combination defined in claim 13 wherein said force-storing means includes a pair of axially offset pressure members axially shiftable relative to one another and to said piston, and spring means seated against said pressure members and urging them axially apart, said piston forming a lost-motion linkage with said pressure members, said housing means being provided with a pair of axially spaced abutments constituting said abutment means and respectively engageable with said pressure members at least upon unloading of said spring means.

18. The combination defined in claim 13 wherein said one of said members is said pump member, said pump member being swingable about an axis and having an axle connected thereto, said system further comprising a pinion gear connected with said axle, said follower piston forming a rack meshing with said pinion.

References Cited by the Examiner

UNITED STATES PATENTS

| | | | |
|---|---|---|---|
| 2,263,315 | 11/1941 | Rose | 60—53 |
| 2,283,321 | 5/1942 | Doe et al. | 60—53 |
| 3,126,707 | 3/1964 | Hann et al. | 60—53 |
| 3,132,486 | 5/1964 | Jonkers et al. | 60—53 |

EDGAR W. GEOGHEGAN, *Primary Examiner.*